US006935806B2

(12) United States Patent
Nell

(10) Patent No.: US 6,935,806 B2
(45) Date of Patent: Aug. 30, 2005

(54) HINGED ANNULAR SHAFT FLANGE

(75) Inventor: Richard T. Nell, Colgate, WI (US)

(73) Assignee: Waukesha Tool & Stamping, Inc., Sussex, WI (US)

( * ) Notice: Subject to any disclaimer, the term of this patent is extended or adjusted under 35 U.S.C. 154(b) by 0 days.

(21) Appl. No.: 10/600,492

(22) Filed: Jun. 20, 2003

(65) Prior Publication Data
US 2004/0258875 A1 Dec. 23, 2004

(51) Int. Cl.⁷ .................................................. F16D 1/00
(52) U.S. Cl. ......................................... 403/344; 428/99
(58) Field of Search .................. 428/36.9, 99; 403/344, 403/DIG. 7, 263, 195

(56) References Cited

U.S. PATENT DOCUMENTS

| | | | |
|---|---|---|---|
| 210,560 A | 12/1878 | Robertshaw | |
| RE18,144 E | 8/1931 | Heiermann | |
| 1,952,955 A | 3/1934 | Trageser et al. | 113/112 |
| 3,627,360 A | 12/1971 | Berno | 287/20 |
| 3,703,113 A | 11/1972 | Feisel | 82/30 |
| 3,752,515 A | 8/1973 | Oaks et al. | 287/52 |
| 4,068,750 A | 1/1978 | Gatewood | 192/111 |
| 4,116,572 A | 9/1978 | Heldmann | 403/7 |
| 4,149,336 A | 4/1979 | Huse | 43/44.9 |
| 4,152,099 A | 5/1979 | Bingler | 417/420 |
| 4,373,827 A | 2/1983 | Arndt | 403/24 |
| 4,428,697 A | 1/1984 | Ruland | 403/344 |
| 4,637,750 A | 1/1987 | Ward | 403/344 |
| 4,640,639 A | 2/1987 | Matsui | 403/24 |
| 4,692,053 A | 9/1987 | Sampedro | 403/24 |
| 4,763,951 A | 8/1988 | Silverman | 297/354 |
| 4,804,288 A | 2/1989 | Tiernan, Jr. | 403/24 |
| 4,890,946 A | 1/1990 | von Pragenau | 403/13 |
| 4,902,156 A | 2/1990 | Deisler et al. | 403/24 |
| 4,948,288 A | 8/1990 | Medgvesy | 403/24 |
| 5,074,724 A | 12/1991 | McCracken | 409/182 |
| 5,085,535 A | 2/1992 | Solberg | 403/24 |
| 5,090,066 A | 2/1992 | Schoepe et al. | 4/378 |
| 5,145,273 A | 9/1992 | Hellon et al. | 403/24 |
| 5,201,545 A | 4/1993 | Boersma | 280/777 |
| 5,302,046 A | 4/1994 | Mathes | 403/370 |
| 5,352,055 A | 10/1994 | Hellon et al. | 403/24 |
| 5,353,055 A | 10/1994 | Hiramatsu | 348/145 |
| 5,393,160 A | 2/1995 | Ojima | 403/120 |
| 5,439,310 A | 8/1995 | Evenson et al. | 403/321 |
| 5,509,864 A | 4/1996 | Hauser | 475/316 |
| 5,857,800 A | 1/1999 | Nell | 403/344 |
| 6,155,743 A * | 12/2000 | Chen | 403/374.1 |
| 6,439,799 B1 * | 8/2002 | Husson | 403/344 |

* cited by examiner

Primary Examiner—Alexander S. Thomas
(74) Attorney, Agent, or Firm—Andrus, Sceales, Starke & Sawall, LLP

(57) ABSTRACT

An annular shaft flange that can be positioned along the length of a shaft and secured to the shaft to prevent movement of an article along the length of the shaft. The annular shaft flange includes a pair of nesting ends that are attachable to each other using a mechanical interlocking member.

6 Claims, 3 Drawing Sheets

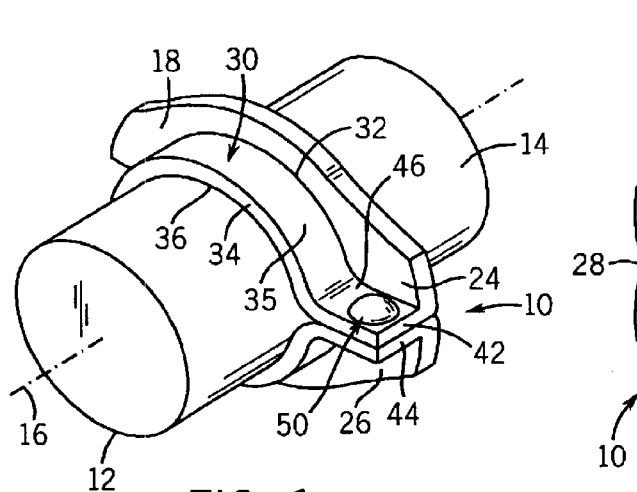
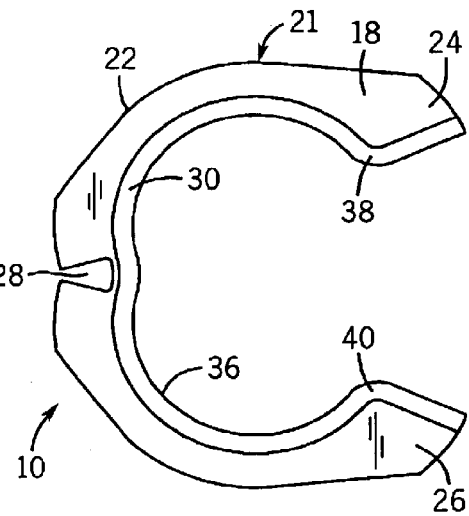
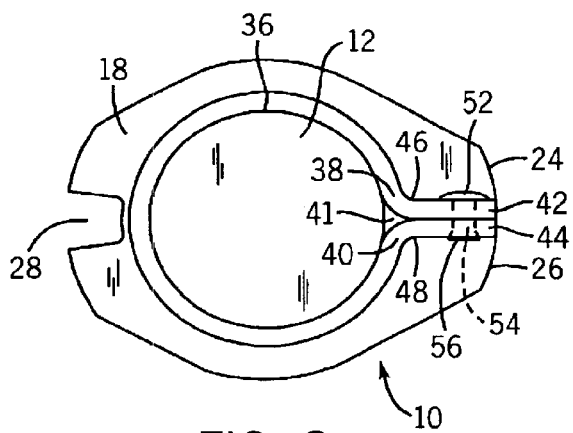
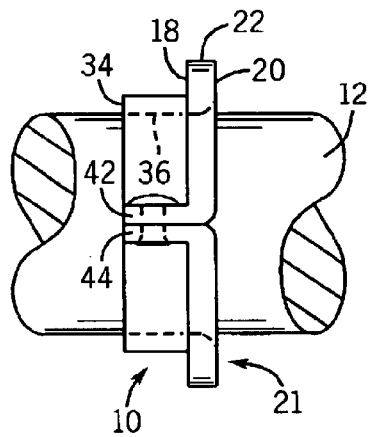
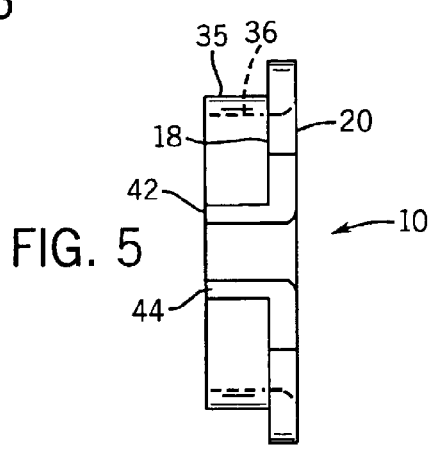

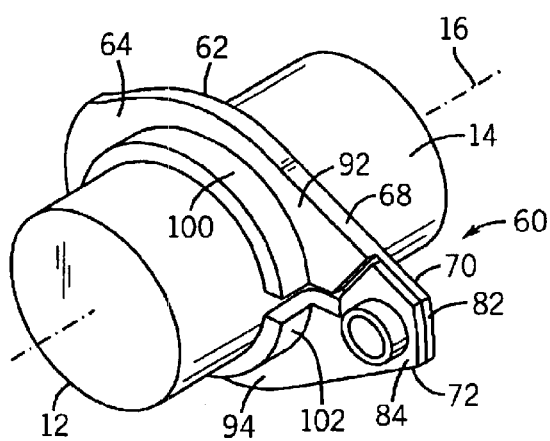
FIG. 11
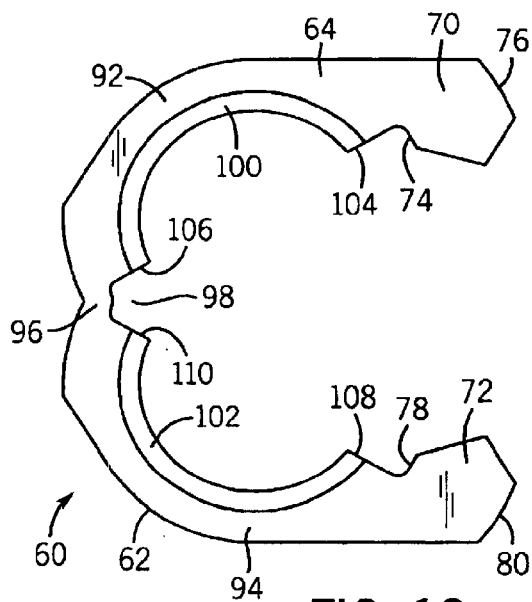
FIG. 12
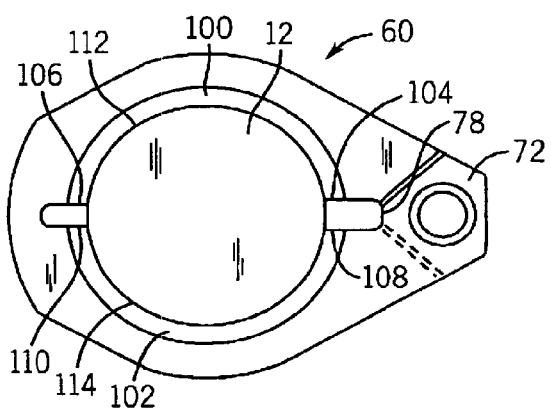
FIG. 13
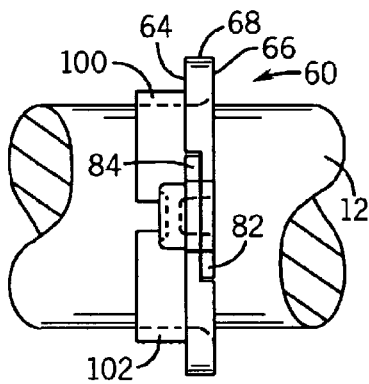
FIG. 14
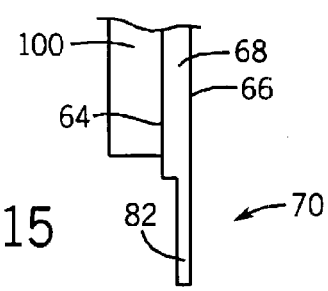
FIG. 15
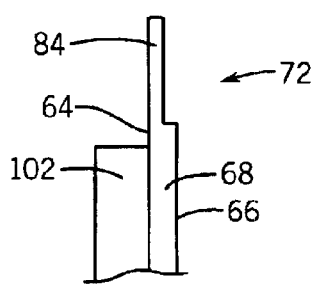

HINGED ANNULAR SHAFT FLANGE

BACKGROUND OF THE INVENTION

The present invention relates to an annular shaft flange that can be positioned on a shaft and fixed in place. The flange functions as a stop to locate a shaft at a particular distance or to retain an object in a desired position along the shaft.

Previous devices, such as snap rings, cotter pins or flip pins require the shaft to be machined or drilled, thereby weakening the shaft and adding additional cost to the manufacturing process. A locking ring requires no machining, but has a greater cost penalty and can only be placed on the shaft if the diameter of the shaft is constant or has an area of reduced diameter.

Presently, annular shaft flanges, such as shown in Nell U.S. Pat. No. 5,857,800, owned by the assignee of the present application, have been successful in providing a method of securing an object along a shaft and preventing the object from moving along the length of the shaft. However, the shaft flange taught by the Nell '800 patent preferably uses a spot weld to secure the two ends of the shaft flange in place. Although spot welding has proven to be an effective method of retaining the two ends of the shaft flange, a need has arisen to provide alternate methods of securing the two ends of the shaft flange to eliminate the need for a spot weld. The apparatus and method of the present invention address this need in a novel manner.

SUMMARY OF THE INVENTION

The present invention is an annular shaft flange that can be attached to a shaft to provide a stable point along the longitudinal length of the shaft to prevent movement of objects along the shaft.

In a first embodiment of the invention, the annular shaft flange includes a flange body that is movable between an open position and a closed position. A hinge is formed in the flange body to permit movement of the flange body between the open and closed positions.

The flange body includes an inner curved engagement surface that is sized to interact with the outer surface of the shaft when the shaft flange is moved to the closed position. The curved inner engagement surface provides an area of frictional engagement between the shaft flange and the annular shaft.

The body of the annular shaft flange extends between a first end and a second end. The first and second ends are spaced from each other when the shaft flange is in the open position. The first end of the flange body includes a first attachment projection, while the second end of the flange body includes a second attachment projection. When the shaft flange is moved to the closed position, the first attachment projection is positioned in contact with the second attachment projection.

The first and second attachment projections of the shaft flange extend generally parallel to the longitudinal axis of the shaft to which the shaft flange is being attached. Each attachment projection projects radially away from the shaft to provide areas for joining the first and second ends of the flange body to each other. Preferably, an attachment member, such as a rivet, passes through the first and second attachment projections such that the attachment member can secure the flange body in the closed position.

In the preferred embodiment of the invention, the annular shaft flange includes a shaft engagement lip that extends axially from the first end face of the flange body. The shaft engagement lip increases the overall axial width of the shaft flange and combines with the flange body to define the curved engagement surface. The shaft engagement lip increases the surface area contact between the annular shaft flange and the shaft to further prevent movement of the shaft flange along the shaft.

In an alternate embodiment of the invention, the annular shaft flange includes a flange body having a flange portion having a width defined by a first end face and a second end face. The first and second end faces are spaced from each other along the longitudinal axis of the shaft to which the annular shaft flange is mounted. The flange body includes a hinge that allows the flange body to move from an open position to a closed position. The flange body defines an inner curved engagement surface that contacts an outer surface of the shaft when the shaft flange is positioned along the shaft and in a closed position.

The shaft flange of the second embodiment of the invention includes first and second nest ends that are spaced from each other when the shaft flange is in an open position. The first nest end includes a first attachment lip, while the second nest end includes a second attachment lip. Both the first and second attachment lips have width of approximately one-half the axial width of the flange portion of the shaft flange. When the shaft flange is moved to the closed position, the first and second attachment lips overlap each other.

When the shaft flange is in the closed position, a mechanical attachment member is positioned to extend between the first and second attachment lips to hold the shaft flange in the closed position. In one embodiment of the invention, the mechanical attachment member is a rivet, while other types of mechanical attachment means, such as Tox-Loc®, are contemplated as being within the scope of the invention.

The first and second attachment lips include an inner edge surface that is spaced radially from the outer surface of the shaft to which the flange is applied. The spacing between the shaft and the inner edge of each attachment lip provides additional room for utilizing the mechanical attachment member to hold the shaft flange in its closed position.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a perspective view of a first embodiment of an annular shaft flange of the present invention in a closed position around a shaft;

FIG. 2 is an end view of the annular shaft flange in an open position;

FIG. 3 is an end view of the annular shaft flange in a closed position;

FIG. 4 is a side view of the annular shaft flange in a closed position;

FIG. 5 is a side view of the annual shaft flange in a partially open position;

FIG. 11 is a perspective view of a third embodiment of an annular shaft flange of the present invention in a closed position around a shaft;

FIG. 12 is an end view of the annular shaft flange of FIG. 11 in an open position;

FIG. 13 is an end view of the annular shaft flange of FIG. 11 in a closed position;

FIG. 14 is a side view of the annular shaft flange of FIG. 111 in a closed position;

FIG. 15 is a side view of the annular shaft flange of FIG. 11 in a partially open position;

DETAILED DESCRIPTION OF THE INVENTION

Figure 6:
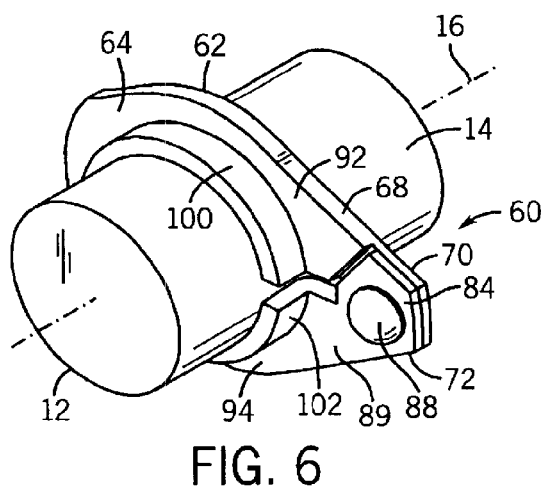
FIG. 6 is a perspective view of a second embodiment of an annular shaft flange of the present invention in a closed position around a shaft.

Referring first to FIGS. 1–5, thereshown is an annular shaft flange 10 of the first embodiment of the present invention. The annular shaft flange 10 is shown in FIG. 2 in an open position and in FIG. 3 in a closed position. As illustrated in FIG. 3, when the shaft flange 10 is in the closed position, the shaft flange 10 surrounds and engages a shaft 12.

In the embodiment of the invention shown in FIGS. 1–5, the annular shaft flange 10 includes a one-piece body that can be formed from any ferrous, non-ferrous or plastic material. The flange 10 could be constructed in pure element form, or in compound form, or as a mixture. Additionally, the shaft flange 10 could be formed from two separate halves joined to each other in the manner to be set forth below.

Referring back to FIG. 1, the annular shaft flange 10 is shown engaged with an outer surface 14 of the shaft 12. The shaft 12 extends along a longitudinal axis 16. The shaft flange 10 functions to provide a stop member to prevent lateral movement of components along the longitudinal axis 16 of the shaft 12.

Referring now to FIG. 2, the shaft flange is manufactured in the open position illustrated. The shaft flange 10 includes a first end face 18 and a second end face 20 (FIG. 4) that are parallel and spaced from each other. As illustrated in FIG. 4, the first end face 18 and second end face 20 define the axial width of the radially extending flange portion 21 of the shaft flange 10 and each terminate at an outer edge surface 22.

As illustrated in FIG. 2, the outer edge surface 22 extends from a first end 24 of the flange body to a second end 26 of the flange body. The outer edge surface 22 is interrupted by a hinge channel 28 that extends inwardly from the outer edge surface 22. As illustrated in FIG. 2, the hinge channel 28 allows the body of the annular shaft flange 10 to flex from the open position shown in FIG. 2 to the closed position shown in FIG. 3.

Referring back to FIG. 1, the annular shaft flange 10 of the first embodiment includes a contact projection 30 that extends from the first end face 18. The contact projection 30 is a generally annular member that extends away from the first end face 18 in a direction parallel to the longitudinal axis 16 of the shaft 12 when the annular shaft flange 10 is in the closed position shown in FIG. 1. The contact projection 30 extends from an inner edge 32 to an outer edge 34 and defines an outer face surface 36. Referring back to FIG. 2, the contact projection 30 and the flange portion 21 combine to define a curved inner engagement surface 36. The curved inner engagement surface 36 has an axial length extending from the second end face 20 to the outer edge 34, as can be understood in FIG. 4. The annular shaft flange 10 is constructed such that when the flange 10 is in the closed position, the diameter of the inner engagement surface 36 is slightly less than the outer diameter of the shaft 12 such that the inner engagement surface 36 frictionally engages the shaft 12 to hold the shaft flange 10 in position along the shaft 12.

Referring back to FIG. 2, the curved portion of the inner engagement surface 36 extends from a first end 38 to a second end 40. When the annular shaft flange is in the closed position shown in FIG. 3, the first end 38 is slightly spaced from the second end 40. As illustrated in FIG. 3, a small gap 41 between the first end 38 and the second end 40 allows the inner engagement surface 36 to contact nearly the entire circumferential surface of the shaft 12 to increase the frictional contact between the annular shaft flange 10 and the shaft 12.

Referring back to FIG. 1, the shaft flange 10 further includes a first attachment projection 42 extending from the first end of the flange body and a second attachment projection 44 extending from the second end 26 of the shaft flange. As illustrated best in FIG. 1, both the first attachment projection 42 and the second attachment projection 44 are formed as a continuation of the contact projection 30. However, the first attachment projection 42 and the second attachment projection 44 are positioned away from the outer surface 14 of the shaft 12 and are used to provide a point of attachment for the first end 24 and the second end 26 of the shaft flange to secure the shaft flange 10 in the closed position of FIG. 1.

As illustrated in FIG. 1, both the first attachment projection 42 and the second attachment projection 44 extend from the first end face 18 generally parallel to the longitudinal axis 16. The first attachment projection 42 defines a first connection surface 46, while the second attachment projection 44 defines a second connection surface 48, as best illustrated in FIG. 3. As illustrated in FIG. 3, both the first connection surface 46 and the second connection surface 48 extend radially away from the shaft 12 from the first end 38 and the second end 40 of the inner engagement surface 36, respectively.

As illustrated in FIGS. 1 and 3, when the annular shaft flange 10 is bent into its closed position, the first attachment projection 42 comes into contact with the second attachment projection 44 and the curved inner engagement surface 36 is in frictional contact with the outer surface 14 of the shaft 12.

Once the shaft flange 10 has been clamped into the closed position, a mechanical attachment member 50 is used to secure the first end 24 to the second end 26 to retain the shaft flange 10 in its closed position. In the embodiment of the invention illustrated in FIGS. 1–5, the mechanical attachment member 50 is a rivet. As illustrated in FIG. 3, the rivet head 52 contacts the first connection surface 46, while the rivet body 54 passes through the first attachment projection 42 and the second attachment projection 44. In the preferred embodiment of the invention, the rivet is a self-piercing rivet that has an expanded lower end 56 that holds the rivet in place as shown.

Although a rivet is shown in the embodiment of the invention, it should be understood that other types of mechanical attachment members 50 can be used while operating within the scope of the present invention. Additionally, it is contemplated that other methods, such as welding, Tox-Loc® or other types of mechanical connections can be utilized while operating within the scope of the present invention.

In an alternate embodiment of the invention, the shaft flange 10 can be formed having two separate body members. In this type of configuration, the first half of the flange body would include a pair of first attachment projections that would engage a pair of second attachment projections formed on the mating second half of the flange body. The two-piece flange body would be secured to the shaft by a pair of mechanical attachment members, such as the rivets shown.

Figure 7:
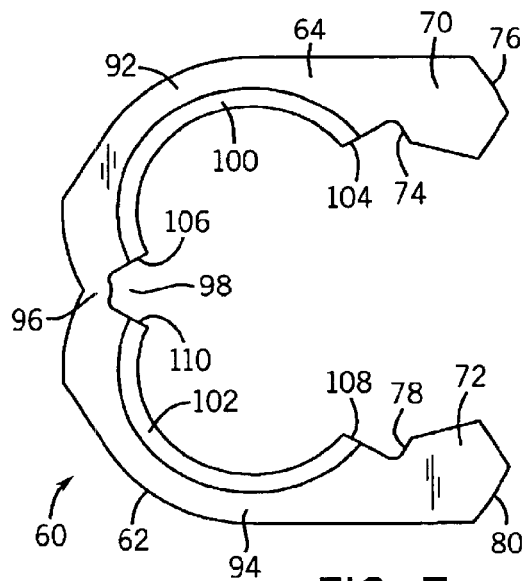
FIG. 7 is an end view of the annular shaft flange of FIG. 6 in an open position.
Figure 8:
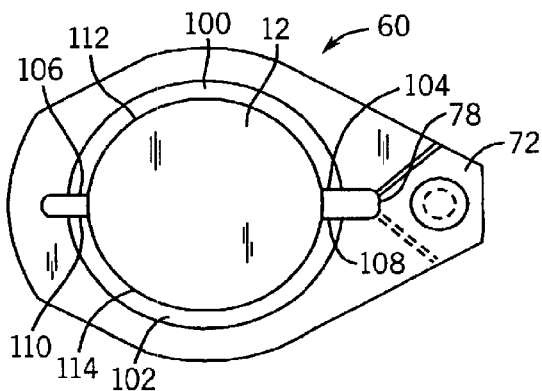
FIG. 8 is an end view of the annular shaft flange of FIG. 6 in a closed position.
Figure 9:
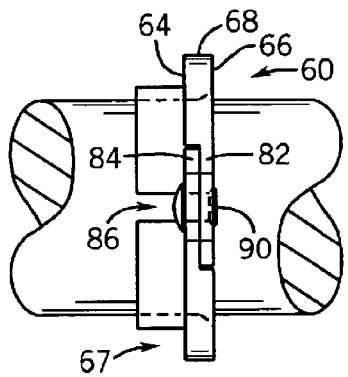
FIG. 9 is a side view of the annular shaft flange of FIG. 6 in a closed position.

Referring now to FIGS. 6–10, there shown is a second embodiment of the annular shaft flange 60. The annular shaft flange 60 includes many similar components to the first embodiment of the shaft flange 10 shown in FIGS. 1–5 and common reference numerals will be used when appropriate. As illustrated in FIG. 6, the annular shaft flange 60 includes a flange body 62. The flange body 62 includes a first end face 64 and a second end face 66, as shown in FIG. 9. The first and second end faces 64, 66 are parallel and opposed and define a radially extending flange portion 67 having an axial width. The first and second end faces are spaced from each other by an outer edge surface 68.

As illustrated in FIG. 7, the annular shaft flange 60 of the second embodiment includes a first nest end 70 and a second nest end 72. As illustrated in FIG. 7, the first nest end 70 and the second nest end 72 are integrally formed with the flange body 68. The first nest end 70 extends from an inner edge 74 to an outer edge 76. Likewise, the second nest end 72 extends from an inner edge 78 to an outer edge 80.

Figure 10:
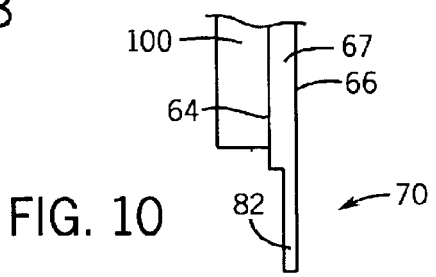
FIG. 10 is a side view of the annular shaft flange of FIG. 6 in a partially open position.

Referring now to FIG. 10, the first nest end 70 includes a first attachment lip 82. The first attachment lip 82 has a width of approximately one-half the width of the flange portion 67 between the first end face 64 and the second end face 66. Likewise, the second nest end 82 includes a second attachment lip 84 that also has a width of approximately one-half the width of the flange portion 67 from the first end face 64 to the second end face 66.

As can be best understood in FIGS. 9 and 10, when the shaft flange 60 is moved to the closed position, the first attachment lip 82 overlaps the second attachment lip 84 to define a nest area. When the first attachment lip 82 overlaps the second attachment lap 84, a mechanical attachment member 86 can be used to attach the two ends of the shaft flange 60 and hold the shaft flange 60 in the closed position shown in FIG. 1. As can be seen in FIG. 6, in the preferred embodiment of the invention, the mechanical attachment member is a rivet having a rivet head 88 that engages a face surface 89 of the second attachment lip 84. As can be seen in FIG. 9, the shaft of the rivet extends through both the first attachment lip 82 and the second attachment lip 84 and the expanded end 90 of the rivet holds the rivet in place to prevent separation.

FIGS. 11–15 illustrate an alternate type of mechanical attachment member for securing the first attachment lip 82 to the second attachment lip 84. In the embodiment of the invention illustrated, the mechanical attachment means is a Tox-Loc® engagement. In a Tox-Loc® engagement, a portion of the metallic material used to form the first attachment lip 82 is used to engage a portion of the metal material used to form the second attachment lip 84. This type of mechanical interconnection, as best shown in FIG. 14, does not require any additional components to form the mechanical interconnection between the two ends of the shaft flange.

Although the mechanical attachment member is shown in the second embodiment to include either a rivet or a Tox-Loc® interconnection, it is contemplated by the inventor that other types of mechanical interconnections can be utilized while operating within the scope of the present invention. Referring back to FIG. 7, the annular shaft flange 60 of the second embodiment of the invention includes a first body member 92 and a second body member 94 joined to each other along a hinge 96. The hinge 96 is opposite a hinge channel 98 that allows the annular shaft flange 60 to move from the open position shown in FIG. 7 to the closed position shown in FIG. 8.

As illustrated in FIG. 6, both the first body member 92 and the second body member 94 include contact projections 100, 102. The contact projections 100, 102 each extend from the first end face 64 of the annular shaft flange parallel to the longitudinal axis 16 of the shaft 12. As illustrated in FIG. 7, the contact projection 100 is a nearly semi-circular member extending from a first end 104 to a second end 106. Likewise, the contact projection 102 is a semi-circular member extending from a first end 108 to a second end 110.

When the shaft flange 60 is in the closed position illustrated in FIG. 8, the first ends 104, 108 of the contact projections 100, 102 are slightly spaced from each other, as are the second ends 106, 110. When the shaft flange 60 is in the closed position shown in FIG. 8, a first contact surface 112 formed by the contact projection 100 and a second contact surface 114 formed by the contact projection 102 engage nearly the entire outer circumferential surface of the shaft 12. In this manner, the annular shaft flange 60 is securely attachable to the shaft 12.

As illustrated in FIG. 8, the inner edge 78 of the second nest end 72 is spaced radially from the outer surface of the shaft 12. Likewise, the inner end 74 of the first nest end 70 is also spaced radially from the outer surface of the shaft 12. The spacing of the first and second nest ends 70, 72 from the outer circumference of the shaft 12 provides additional space for the use of the mechanical attachment member used to secure the two ends of the shaft flange.

As discussed above, the embodiment of the invention shown in FIGS. 11–15 is a variation on the mechanical attachment between the nest ends 70, 72 of the attachment flange 60. Thus, similar reference numerals are included in FIGS. 11–15 for those components similar to the embodiment shown in FIGS. 6–10. However, the second embodiment of FIGS. 11–15 introduces an alternate type of mechanical interconnection between the nest ends 70 and 72.

Various alternatives and embodiments are contemplated as being within the scope of the following claims particularly pointing out and distinctly claiming the subject matter regarded as the invention.

I claim:

1. An annular shaft flange for attachment to a shaft extending along a longitudinal axis, the shaft flange comprising:

a flange body having a first end face and a second end face being parallel and opposed, the first and second end faces being spaced to define an axial width of the shaft flange;

an inner curved engagement surface configured to contact an outer surface of the shaft when the shaft flange is attached to the shaft;

a first end and a second end formed on the flange body, the first and second ends being spaced from each other when the shaft flange is in an open position;

a first attachment projection extending from the first end of the flange body in a direction parallel to the longitudinal axis of the shaft;

a second attachment projection extending from the second end of the flange body in a direction parallel to the longitudinal axis of the shaft; and a shaft engagement lip extending axially from the first end face of the flange body, the shaft engagement lip being integrally formed with both the first attachment projection and the second attachment projection, wherein the curved engagement surface is formed by both the shaft engagement lip and the flange body;

wherein the first attachment projection and the second attachment projection contact each other when the shaft flange is in the closed position;

wherein when the flange body is in the closed position, the first attachment projection can be attached to the second attachment projection to retain the shaft flange in the closed position.

2. The annular shaft flange of claim 1 further comprising a rivet extending between the first attachment projection and the second attachment projection, wherein the rivet extends perpendicular to the longitudinal axis of the shaft.

3. An annular shaft flange for attachment to a shaft extending along a longitudinal axis, the shaft flange comprising:

a flange body having a first end face and a second end face being parallel and opposed, the first and second end faces being spaced to define an axial with of the shaft flange, wherein the flange body is a one-piece member and includes a hinge formed opposite the first and second ends of the flange body;

an inner curved engagement surface configured to contact an outer surface of the shaft when the flange is attached to the shaft;

a first end and a second end formed on the flange body, the first and second ends being spaced from each other when the shaft flange is in an open position;

a first attachment projection extending from the first end of the flange body in a direction parallel to the longitudinal axis of the shaft;

a second attachment projection extending from the second end of the flange body in a direction parallel to the longitudinal axis of the shaft; and a shaft engagement lip extending axially from the first end face of the flange body, the shaft engagement lip being integrally formed with both the first attachment projection and the second attachment projection, wherein the curved engagement surface is formed by both the shaft engagement lip and the flange body, wherein the first attachment projection and the second attachment projection contact each other when the shaft flange is in the closed position;

wherein when the flange body is in the closed position, the first attachment projection can be attached to the second attachment projection to retain the shaft flange in the closed position.

4. The annular shaft flange of claim 3 further comprising a rivet extending between the first attachment projection and the second attachment projection.

5. The annular shaft flange of claim 3 wherein the shaft engagement lip contacts the outer surface of the shaft when the shaft flange is attached to the shaft.

6. The annular shaft flange of claim 3 wherein the shaft engagement lip has an axial width greater than the axial width of the shaft flange.

* * * * *